May 3, 1960     H. HARRISON     2,934,950
WIND SPEED AND DIRECTION INDICATOR

Filed May 27, 1955     2 Sheets-Sheet 1

INVENTOR
HENRY HARRISON
BY Cushman, Darby & Cushman
ATTORNEYS

May 3, 1960 H. HARRISON 2,934,950
WIND SPEED AND DIRECTION INDICATOR
Filed May 27, 1955 2 Sheets-Sheet 2

INVENTOR
HENRY HARRISON

BY Cushman, Darby & Cushman
ATTORNEYS

United States Patent Office 2,934,950
Patented May 3, 1960

---

2,934,950

WIND SPEED AND DIRECTION INDICATOR

Henry Harrison, Port Washington, N.Y.

Application May 27, 1955, Serial No. 511,483

12 Claims. (Cl. 73—189)

The present invention relates to a wind speed and direction indicator.

It is an object of the present invention to provide a simple and inexpensive means for indication of the speed and direction of the wind.

It is an additional object to provide such an indicator wherein the indicating means are remote from the wind-sensing elements.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The device of the present invention, which includes a pickoff head and an indicator, is suitable for household use as well as in yacht clubs and airports where the measurement of wind speed and direction is of considerable practical importance. Two embodiments of the invention, selected for purposes of illustration only, are shown in the drawings, in which Figure 1 is a plan view partially in section of the pickoff head;

Figure 1:
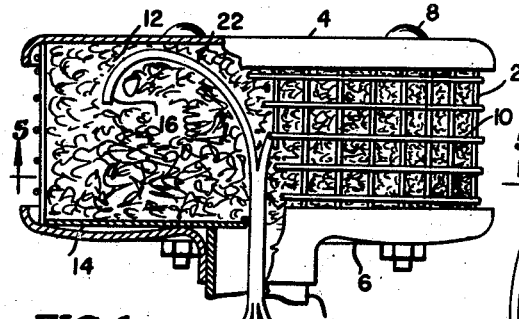
Figure 2:
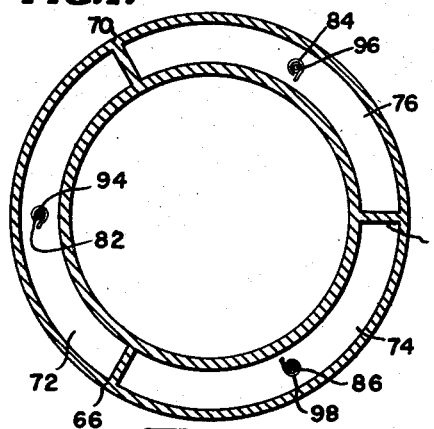
Figure 2 is a section on the line 2—2 in Figure 3.
Figure 5:
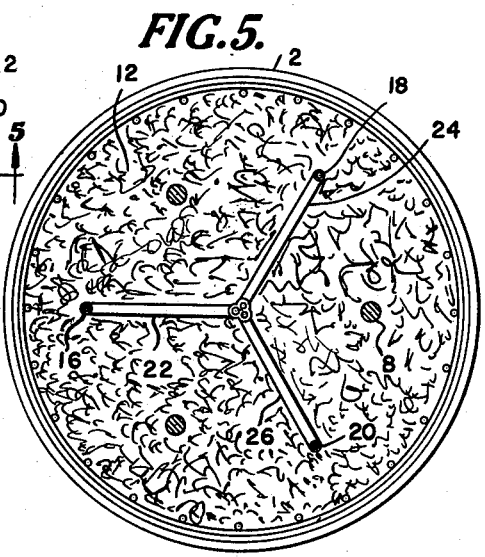
Figure 5 is a section along the lines 5—5 in Figure 1.
Figure 4:
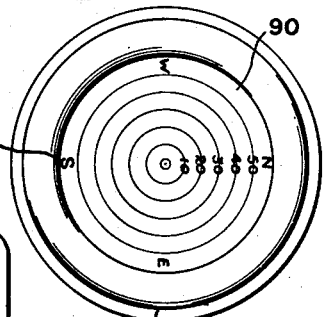
Figure 4 is a top plan view of the calibrated scale on the indicator.
Figure 3:
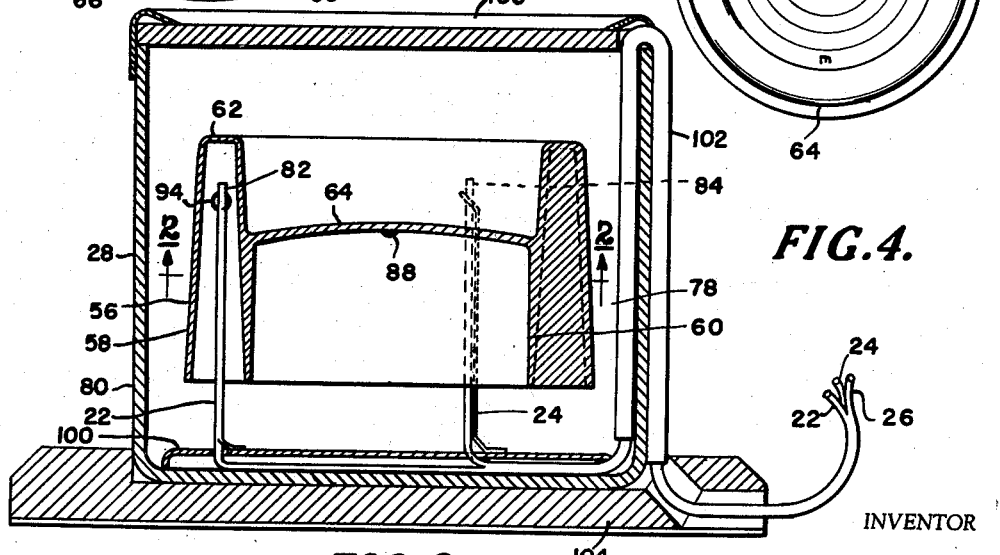
Figure 3 is a vertical section through the indicator.

Referring to the drawings, and more specifically to Figure 1, the pickoff head 2 is a cylindrical device about 4 inches in diameter, having circular top and bottom covers 4 and 6, respectively, made of heavy gauge aluminum or other weather-resistant material. The top and bottom covers may be secured in place by any suitable means, such as bolts 8. The cylindrical side surface is made of coarse screening 10. Within the pickoff head and retained by the screen 10 and the top cover 4, the bottom cover 6, and a washer 14 immediately above the bottom cover, is a mat or wad of water repellant fibers 12. These fibers can be made of silicone, e.g., dimethylpolysiloxane, treated glass fibers, or they can be Teflon (polytetrafluoroethylene) shavings. This mat or felt offers a substantially uniform resistance to the passage of air. Embedded in the felt, at substantially 120° spacing on a circle ⅔ of the outer diameter, of the pickoff head are the three open ends 16, 18 and 20 of three small tubes 22, 24 and 26. The tubes can be made of glass, plastic, metal or other material. These tubes may be circular or may have any other convenient cross section, and they need not be of exactly the same internal diameter.

The pickoff head is mounted in the wind stream to be measured. For example, it can be placed on the top of a flagpole or on a television aerial, or it can be mounted in any other convenient location. The pickoff head is connected to the indicator 28, which may be located in the house, by means of the three air tubes 22, 24 and 26 which may pass through pickoff head supporting pipe 30 before entering the house in order to afford protection for the tubes.

The air tubes can all be enclosed by a larger tube 31 (Figure 6) fitting somewhat closely around them for the entire distance from where they converge near the center axis of the pickoff head until they enter indicator 28, if such is desired for purposes of manipulation or appearance.

In addition to forming a support for the pickoff head, pipe 30, by having an appropriate opening leading into the house, can serve the additional function of being a conduit to pass warm air from the house up to the pickoff head in order to melt any ice or snow which may become deposited on or in the pickoff felt.

When the wind blows, the pressures appearing on the surface of the pickoff head 2 will be symmetrical about the wind direction, but proportional to the square of the wind speed. They will depend on the cosine of the angle from the wind direction, but will not be more than roughly proportional to it. In other words, the wind pressure distribution on the peripheral surface of the pickoff head is a maximum on that portion directly facing the wind and varies from point to point in a manner which depends strongly on the proportions of the pickoff head as an obstacle to the wind. If the pickoff head is cylindrical or circularly symmetrical, the wind pressure distribution will also be symmetrical about the wind direction. The pressure outside the pickoff head, at the surface, will not be closely related to the cosine of the angle with respect to the wind direction. Down inside the felt, however, the pressure will be much more nearly directly proportional to the cosine of the angle from the wind direction, since the resistance of the felt attenuates these irregular departures from this relation near the surface of the pickoff head. Thus, the pressures appearing at the open ends 16, 18 and 20 of the small tubes are vectorially related, with respect to the wind direction, but have magnitudes proportional to the square of the wind speed. This relation is not very sensitive to the exact location of the tubes within the felt or to the inhomogeneity of the felt itself.

At their other ends, the air tubes 22, 24 and 26 communicate with an indicator shown generally at 28. The indicator comprises a float member 56 which may be made of plastic material, e.g., Teflon, polymethylmethacrylate or polystyrene. The float 56 comprises two substantially cylindrical tubes 58 and 60, concentric and joined at their upper ends to form a ring 62 of deep U cross section; and a curved shallow dome shaped disc 64 across the inner cylinder 60, halfway along its length. Partitions 66, 68 and 70 divide the U-shaped cavity into three equal pockets 72, 74 and 76. The indicator floats in a liquid 78, preferably water, inside a larger jar 80, made of glass, clear plastic or other material, and floats in an upright position.

Each of the three tubes 22, 24 and 26 from the pickoff head 2 communicates with a different one of the three pockets 72, 74 and 76 of the U-shaped cavity of the float, the three pockets serving as pressure chambers. Tubes 22, 24 and 26 extend sufficiently high in the jar 80 that their ends 82, 84 and 86, respectively, open above the level of the liquid in the jar. Thus, when the wind blows, the float tips, by an amount, and in a direction, depending on the speed and direction of the wind.

The dome-shaped disc 64 has under it a small bubble 88 of air or other gas, so that the amount and direction of the tilting of the float is made evident in the amount and direction of the motion of the bubble away from the center of the dome-shaped disc. A scale 90 is provided on the top of the disc to measure this displacement as wind speed. The shape or contour of the dome may be chosen so that the displacement of the bubble is directly proportional to the wind speed, by making the shape substantially a cubical parabola. Direction marks 92 may also be put directly on the disc, since the wind direction is indicated relative to the position of the U-shaped pockets, and not relative to the compass.

In order to center the float, the ends 82, 84 and 86 of the tubes are supported on thin spring wire posts 94, 96 and 98. These posts are soldered into a disc 100 which lies in the bottom of the glass jar 80. The tubes pass over the edge of the jar protected by a decorative metal channel 102 formed into a U and continue out after being secured to a pedestal or coaster 104 which supports the glass jar 80 out of contact with the furniture surface on which it rests. A glass or plastic cover 106, centered on the jar by a decorative ring, prevents the escape of vapor from the water or other liquid in the jar.

Surface tension in the supporting liquid can have an important and disturbing influence in tilting the float 56. To minimize its effects, the float can be made of a non-wetting plastic, such as Teflon (polytetrafluoroethylene). Alternatively, the surface tension of the water or other liquid may be reduced by use of a suitable detergent, e.g., Aerosol OT (sodium dioctyl sulfosuccinate), sodium higher (e.g., 10 to 18 carbon atoms) alkyl benzene sulfonates, or p-isooctyl phenol-10 ethylene oxide. It will be apparent that the use of both a float made of a non-wetting plastic and the employment of a detergent in the liquid can be used simultaneously.

If desired, the float can be made of colored transparent plastic and the water or other liquid may be colored with a dye to produce a pleasing decorative effect. The tube support base 100, at the bottom of the jar, should preferably be given a highly reflecting non-specular surface, in order to make it easy to see the bubble.

The use of three air tubes, as in Figures 1, 2, 3 and 5, provides a simple system for measuring wind speed and direction. Additional accuracy can be obtained by using more tubes. The effect of using many tubes is to produce good directional accuracy without an accurate cosine law at the pickoff. Consequently, the resistive felt 12 can be eliminated if a sufficient number of tubes, e.g., six tubes are employed.

Figure 6:
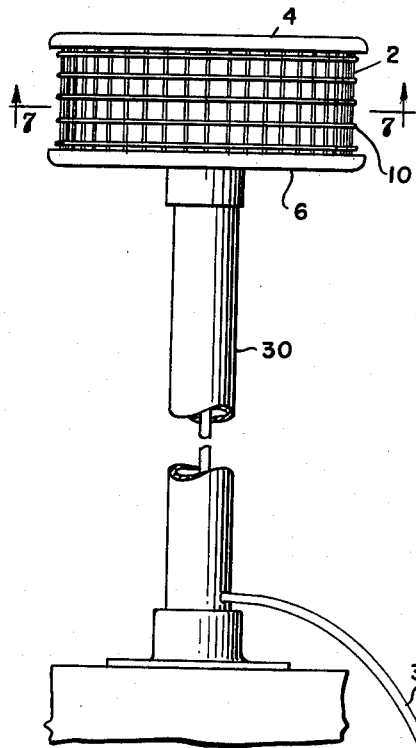
Figure 6 is a vertical elevation partially broken away showing the pickoff head connected to the indicator in another form of the invention.
Figure 7:
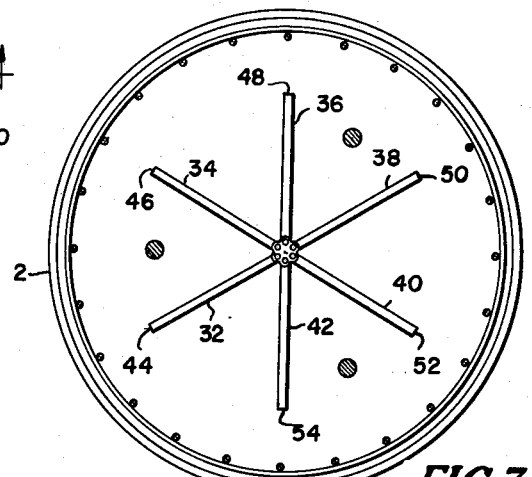
Figure 7 is a section along the lines 7—7 in Figure 6.
Figure 8:
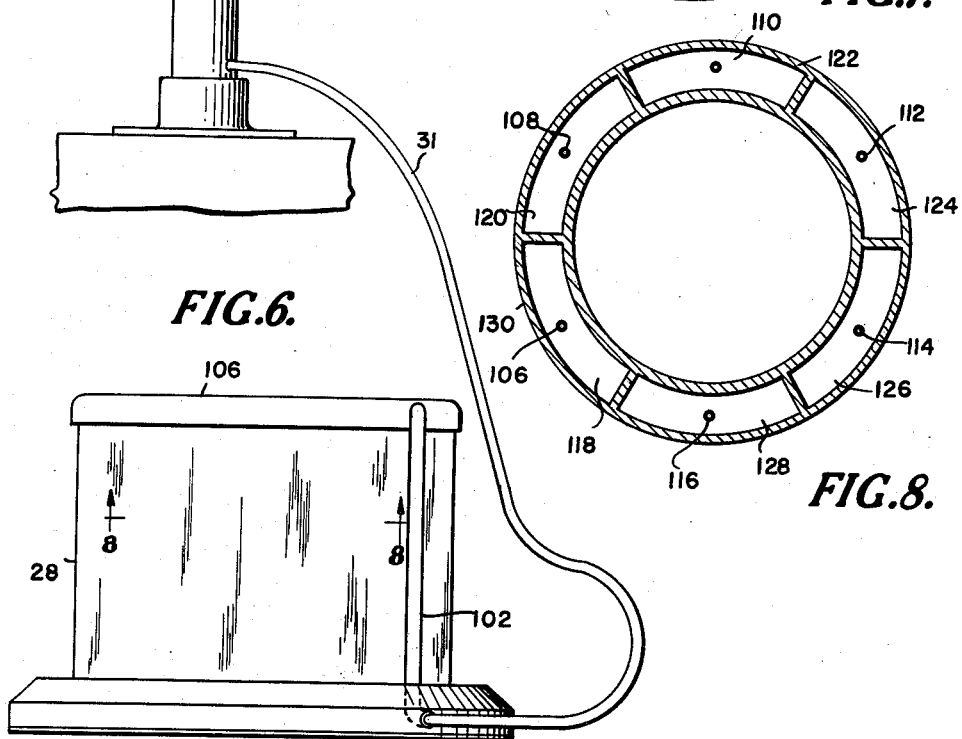
Figure 8 is a section along the lines 8—8 in Figure 6.

Figures 6, 7 and 8 show such an alternative form of the apparatus, wherein six air tubes 32, 34, 36, 38, 40 and 42, are employed, having first open ends 44, 46, 48, 50, 52 and 54, in the pickoff head 2 and spaced at substantially 60° on a circle ¾ of the outer diameter of the pickoff head. The six air tubes 32, 34, 36, 38, 40 and 42 have their second open ends 106, 108, 110, 112, 114 and 116 in pockets 118, 120, 122, 124, 126, 128 in the sides of the float 130, in a manner exactly analogous to the manner in which ends 82, 84 and 86 of air tubes 22, 24, 26 are in pockets 72, 74 and 76 in the first described form of the invention. While no mat of water repellant fibers is shown in Figure 6, it will be evident that, to still further increase the accuracy of the device, such a mat can be employed, even when six or more air tubes are used. When the felt is omitted, it is necessary for the ends of the tubes to be disposed with the axes in a horizontal plane uniformly spaced apart as shown in Figure 7. However, if the felt is employed, the axes of the ends may have any direction. In place of the fibers, it is also possible to use granular or porous resistive medium as a pervious but wind-resistant matrix. Furthermore, in some instances, there can be employed wettable fibers.

I claim:

1. A wind speed and direction indicator comprising a stationary pickoff head containing at least three conduits having open ends embedded in a pervious but wind-resistant matrix in substantially uniform circumferentially-spaced relation with respect thereto and means operatively connected with said conduits and responsive to air pressure in said conduits for indicating wind speed and direction.

2. A wind speed and direction indicator as claimed in claim 1, wherein the matrix is a mat of water-repellant fibers.

3. A wind speed and direction indicator as claimed in claim 2, wherein the mat of fibers is surrounded by screening.

4. A wind speed and direction indicator comprising a stationary pickoff head and an indicator, said pickoff head containing at least three conduits, said conduits having first open ends disposed in said pickoff head in circumferentially spaced position, said first open ends of the conduits being embedded in a pervious but wind resistant matrix in said pickoff head, said conduits connecting at their second open ends with the indicator, said indicator comprising float means, said float means containing a cavity and partitions dividing the cavity into the same number of equal pockets as the number of said conduits, each pocket receiving the second open end of one of said conduits, the movements of said float means being responsive to air pressure at the first open ends of said conduits, whereby wind speed and direction may be indicated.

5. A wind speed and direction indicator comprising a stationary pickoff head and an indicator, said pickoff head containing at least three conduits, each having a first open end disposed in said pickoff head, said first open ends being disposed in circumferentially spaced position and spaced substantially uniformly in a substantially cylindrical, concentric mat of water-repellant fibers, said conduit connecting at their second open ends with the indicator, said indicator including a float comprising two concentric tubes joined together to form an annular cavity, a curved disk across the inner tube a substantial distance from the top and bottom thereof, said curved disk being hermetically sealed across said inner tube, partitions dividing the cavity into the same number of equal pockets as the number of said conduits, each pocket containing the second open end of one of said conduits, said indicator floating in a liquid maintained in a chamber larger than the indicator, the level of the liquid being maintained below the second open end of said conduit and said inner tube having a trapped bubble of gas trapped under said curved disk and being otherwise filled with liquid for indicating on said curved disk the direction and velocity of wind to which the pickoff head is disposed.

6. An indicator as in claim 5, wherein the pickoff head is supported by a supporting tube which surrounds the open end tubes as they emerge from the pickoff head and whereby warm air may be passed up to melt ice or snow in contact with the fiber mat.

7. A wind speed and direction indicator comprising a pickoff head and an indicator, said pickoff head containing at least three conduits, each having a first open end disposed in said pickoff head, said conduits connecting at their second open ends with the indicator, said indicator including a float comprising two tubes joined together to form a cavity, a hermetically sealed disk across the inner tube a substantial distance from the top and bottom thereof, partitions dividing the cavity into the same number of equal pockets as the number of said conduits, each pocket containing the second open end of one of said conduits, said indicator floating in a liquid maintained in a chamber larger than the indicator, the level of the liquid being maintained below the second open end of said conduit, and means cooperating with said float for indicating on said dome-shaped disk the direction and velocity of wind to which the pickoff head is exposed.

8. A wind speed and direction indicator comprising a pickoff head and an indicator, said pickoff head containing at least six tubes disposed in circumferentially spaced position, each having a first open end disposed in said pickoff head, the said first open ends of the tubes having their axes substantially uniformly spaced apart, said tubes connecting at their second open ends with the indicator, said indicator including a float comprising two concentric tubes joined together at their upper ends to form a cavity, a hermetically sealed curved disk across the inner tube a substantial distance from the top and bottom thereof, partitions dividing the cavity into equal pockets, each pocket containing the second open end of one of said tubes leading from the pickoff head, said indicator floating in a liquid maintained in a chamber larger than the indicator, the level of the liquid being maintained below the second open end of the tubes and a bubble of gas under the curved disk for indicating the amount and direction of the tilting of the float and correspondingly the amount and direction of the wind.

9. A wind speed and direction indicator comprising a stationary cylindrical pickoff head and an indicator, said pickoff head containing three tubes, each having a first open end disposed in said pickoff head, the said first open ends of the tubes being disposed in circumferentially spaced position and having their axes substantially 120° apart, and the said ends being substantially equi-distant from the center of the pickoff head, water repellant fibers within which are embedded the three first open ends of the tubes and screening surrounding said mat, said tubes connecting at their second open ends with the indicator, said indicator including a float comprising two substantially cylindrical concentric tubes joined at their upper ends to form a cavity of U-cross section, a hermetically sealed curved shallow dome-shaped disk across the inner cylinder a substantial distance from both the top and bottom thereof, partitions dividing the U-shaped cavity into three equal pockets each containing the second end of one of said tubes, said indicator floating in a liquid maintained in a chamber larger than the indicator, the level of the liquid being maintained below the second open end of said tubes, the dome-shaped disk having a scale thereon, the disk being substantially in the shape of a cubical parabola, and a bubble of gas under the dome-shaped disk whereby the amount and direction of the tilting of the float and correspondingly the amount and direction of the wind is made evident by the amount and direction of the motion of the bubble away from the center of the dome-shaped disk.

10. A wind speed and direction indicator comprising a cylindrical pickoff head and an indicator, said pickoff head containing at least six tubes disposed in circumferentially spaced position each having a first open end disposed in said pickoff head, the said first open ends of the tubes being substantially equi-distant from the center of the pickoff head and having their axes substantially uniformly spaced apart, said tubes connecting at their second open ends with the indicator, said indicator including a float comprising two substantially concentric tubes joined at their upper ends to form a cavity of U-cross section, a hermetically sealed curved shallow dome-shaped disk across the inner cylinder a substantial distance from the top and bottom thereof, partitions dividing the U-shaped cavity into equal pockets, each pocket containing the second open end of one of said tubes leading from the pickoff head, said indicator floating in a liquid maintained in a chamber larger than said indicator, the level of the liquid being maintained below the second open end of said tubes, the dome-shaped disk having a scale thereon, the disk being substantially in the shape of a cubical parabola, and a bubble of gas under the dome-shaped disk, whereby the amount and direction of the tilting of the float and correspondingly the amount and direction of the wind is made evident by the amount and direction of the motion of the bubble away from the center of the dome-shaped disk.

11. The indicator of claim 4, wherein the float means is supported by a liquid containing a detergent to reduce the surface tension of the water.

12. A device for indicating wind speed and direction comprising a stationary pickoff head and an indicator, said pickoff head containing at least six conduits having first open ends disposed in said pickoff head in circumferentially-spaced relation, each of said conduits having a second open end connected with said indicator, said indicator comprising float means having a cavity and partitions dividing the cavity in the same number of equal pockets as the number of said conduits, each pocket receiving the second open end of one of said conduits, the movements of said float means being responsive to air pressure in said conduits whereby wind speed and direction may be indicated.

References Cited in the file of this patent

UNITED STATES PATENTS

| | | |
|---|---|---|
| 950,013 | Billings | Feb. 22, 1910 |
| 2,125,365 | Waller | Aug. 2, 1938 |
| 2,512,278 | Jones | June 20, 1950 |
| 2,515,251 | Morris | July 18, 1950 |
| 2,645,123 | Hundstad | July 14, 1953 |
| 2,701,474 | Goudy | Feb. 8, 1955 |